(12) United States Patent
Tamano

(10) Patent No.: US 12,518,176 B2
(45) Date of Patent: Jan. 6, 2026

(54) KNOWLEDGE TRACING DEVICE, METHOD, AND PROGRAM

(71) Applicant: NEC Corporation, Tokyo (JP)

(72) Inventor: Hiroshi Tamano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 927 days.

(21) Appl. No.: 17/761,665

(22) PCT Filed: Oct. 3, 2019

(86) PCT No.: PCT/JP2019/039083
§ 371 (c)(1),
(2) Date: Mar. 18, 2022

(87) PCT Pub. No.: WO2021/064931
PCT Pub. Date: Apr. 8, 2021

(65) Prior Publication Data
US 2022/0335309 A1    Oct. 20, 2022

(51) Int. Cl.
| | | |
|---|---|---|
| G06N 5/02 | (2023.01) |
| G06F 18/214 | (2023.01) |
| G06F 18/2415 | (2023.01) |
| G06N 3/047 | (2023.01) |
| G06N 3/08 | (2023.01) |
| G06N 5/022 | (2023.01) |
| G06N 5/04 | (2023.01) |
| G06N 7/01 | (2023.01) |

(Continued)

(52) U.S. Cl.
CPC ............. *G06N 5/02* (2013.01); *G06F 18/214* (2023.01); *G06F 18/2415* (2023.01); *G06N 3/047* (2023.01); *G06N 3/08* (2013.01); *G06N 5/022* (2013.01); *G06N 5/04* (2013.01); *G06N 7/01* (2023.01); *G06N 20/00* (2019.01); *H04L 27/2017* (2013.01)

(58) Field of Classification Search
CPC ........... G06N 5/02; G06N 20/00; G06N 7/01; G06N 5/022; G06N 3/047; G06N 5/04; G06N 3/08; G06N 3/04; H04L 27/2017; G06F 18/2415; G06F 18/214
See application file for complete search history.

(56) References Cited

U.S. PATENT DOCUMENTS

2017/0083823 A1* 3/2017 Shen ....................... G06N 7/01
2020/0218999 A1* 7/2020 Eleftheriadis ........... G06F 17/17

OTHER PUBLICATIONS

International Search Report for PCT Application No. PCT/JP2019/039083, mailed on Dec. 10, 2019.

(Continued)

*Primary Examiner* — Quoc A Tran
(74) *Attorney, Agent, or Firm* — Sughrue Mion, PLLC

(57) ABSTRACT

The variational parameter determination unit 81 determines a variational parameter that specifies a position where a likelihood function and a lower bound of the likelihood function to be approximated by Gaussian are in contact. The gradient direction lower bound calculation unit 82 generates a likelihood function made one-dimensional in a gradient direction at the center of a prior distribution and calculates the lower bound of the generated likelihood function. The full dimensional lower bound calculation unit 83 sets covariances in directions other than the gradient direction to an arbitrary covariance and calculates the lower bounds of the set covariances.

10 Claims, 8 Drawing Sheets

(51) Int. Cl.
G06N 20/00 (2019.01)
H04L 27/20 (2006.01)

(56) References Cited

OTHER PUBLICATIONS

English translation of Written opinion for PCT Application No. PCT/JP2019/039083, mailed on Dec. 10, 2019.
Chris Piech, et al., "Deep Knowledge Tracing", Advances in Neural Information Processing Systems 28 (NIPS 2015), 2015, pp. 1-12.
Penghe Chen et al., "Prerequisite-Driven Deep Knowledge Tracing", IEEE International Conference on Data Mining (ICDM) 2018, pp. 1-10.
Andrew S. Lan et al., "Time-varying Learning and Content Analytics via Sparse Factor Analysis", KDD '14 Proceedings of the 20th ACM SIGKDD international conference on Knowledge discovery and data mining, pp. 452-461, 2014.
Tommi S. Jaakkol et al., "Bayesian parameter estimation via variational methods", Statistics and Computing, vol. 10, Issue 1, pp. 25-37, Jan. 2000.
Yeung, Chun-Kit et al., "Addressing Two Problems in Deep Knowledge Tracing via Prediction Consistent Regularization", v1, Jun. 6, 2018, pp. 1-10, [retrieval date Nov. 28, 2019], Internet: <https://arxiv.org/pdf/1806.02180.pdf>.
Wang, Zhiwei et al., "Deep Knowledge Tracing with Side Information" v1, Sep. 1, 2019, pp. 1-5, [retrieval date Nov. 28, 2019], Internet: <URL:https://arxiv.org/pdf/1909.00372.pdf>.

* cited by examiner

FIG. 3
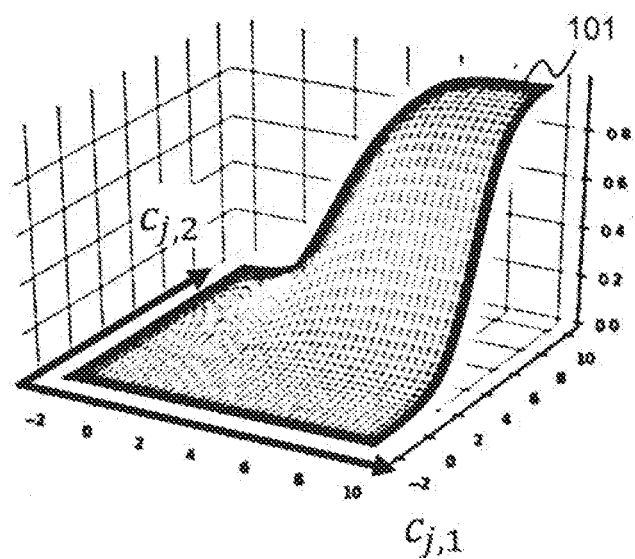
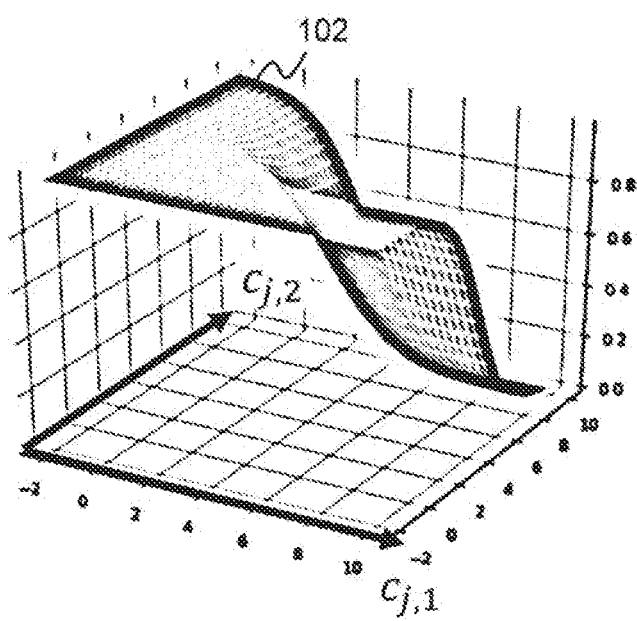

KNOWLEDGE TRACING DEVICE, METHOD, AND PROGRAM

This application is a National Stage Entry of PCT/JP2019/039083 filed on Oct. 3, 2019, the contents of all of which are incorporated herein by reference, in their entirety.

TECHNICAL FIELD

The present invention relates to a knowledge tracing device, a knowledge tracing method, and a knowledge tracing program that trace a knowledge state of a learner.

BACKGROUND ART

In order to make education more effective, it is important to provide education that is fir for an individual learner. Such a system is called adaptive learning. In order to realize such a system, there is a need for computers to automatically provide a skill that is fir for each individual learner. Specifically, it is necessary to constantly trace the knowledge state of each learner and provide appropriate learning according to the knowledge state. This technology of tracing the knowledge state of the learner and providing appropriate information is also known as knowledge tracing.

A method for real-time knowledge tracing is described in non-patent literature 1. The method described in non-patent literature 1 uses Recurrent Neural Networks (RNN) to model student learning.

Real-time knowledge tracing methods are also described in non-patent literature 2 and non-patent literature 3. In the method described in non-patent literature 2, knowledge structure information, especially the prerequisite relations between pedagogical concepts, is incorporated into a knowledge tracing model, and the prerequisite concept pairs are modeled as ordering pairs. The method described in non-patent literature 3 traces the learner's knowledge of concepts over time and estimates a predictive distribution of knowledge states of concepts of a learner at each time, as well as a predictive distribution regarding whether each problem is solved or not.

A method of approximating a likelihood function expressed by a sigmoid function with a Gaussian distribution is described in non-patent literature 4.

CITATION LIST

Non-Patent Literature

NPL 1: Chris Piech, et al., "Deep Knowledge Tracing", Advances in Neural Information Processing Systems 28 (NIPS 2015), 2015.

NPL 2: Penghe Chen, Yu Lu, Vincent W. Zheng, Yang Pian, "Prerequisite-Driven Deep Knowledge Tracing", IEEE International Conference on Data Mining (ICDM) 2018.

NPL 3: Andrew S. Lan, Christoph Studer, Richard G. Baraniuk, "Time-varying Learning and Content Analytics via Sparse Factor Analysis", KDD '14 Proceedings of the 20th ACM SIGKDD international conference on Knowledge discovery and data mining, pp. 452-461, 2014.

NPL 4: Tommi S. Jaakkol, Michael I. Jordan, "Bayesian parameter estimation via variational methods", Statistics and Computing, Volume 10, Issue 1, pp 25-37, January 2000.

SUMMARY OF INVENTION

Technical Problem

In order for the system to be able to follow the learners interacting in real time, knowledge tracing in real time, as described in the above non-patent literatures 1-3, is essential. Furthermore, from the instructor standpoint, there is a need to understand the reasons for the results predicted by knowledge tracing.

For example, in predicting the correctness for a problem, the instructor may want to know why the AI (Artificial Intelligence) predicts that the problem cannot be solved. In other words, when the instructor incorporates a tool using knowledge tracing into learning, explainability of the reason for prediction is required so that the instructor can understand how the AI determines. However, since the method described in non-patent literature 1 uses deep learning to derive the prediction result, it is difficult to present the reason for prediction.

Even if the method can provide a reason, it is difficult to dispel concerns when using it as a tool if there are doubts about the reliability of the reasons. For example, the reliability of predictions based on expected values is considered to be low in the period with little data when learners are beginning to learn a new unit. Therefore, knowledge tracing is also required to provide the reliability of the prediction (for example, a human can determine whether the result is sufficiently reliable or not, the system does not output the estimated value until the reliability is determined to be sufficient, etc.).

The method described in non-patent literature 2 has a certain explainability for the reason of prediction, but it is difficult to present the reliability of the prediction. On the other hand, the method described in non-patent literature 3 can provide the reliability of the prediction, but it is difficult to provide the reason for the prediction. In addition, since the methods described in the non-patent literature 2 and 3 are fundamentally different in terms of the models used, it is difficult to achieve both an explainability and a presentation of a reliability by simply combining these methods.

Therefore, it is an exemplary object of the present invention to provide a knowledge tracing device, a knowledge tracing method, and a knowledge tracing program capable of presenting a reliability of a prediction result while improving an explainability of a prediction reason even when knowledge tracing is performed in real time.

Solution to Problem

A knowledge tracing device according to the exemplary aspect of the present invention includes a variational parameter determination unit which determines a variational parameter that specifies a position where a likelihood function and a lower bound of the likelihood function to be approximated by Gaussian are in contact, a gradient direction lower bound calculation unit which generates a likelihood function made one-dimensional in a gradient direction at the center of a prior distribution and calculates the lower bound of the generated likelihood function, and a full dimensional lower bound calculation unit which sets covariances in directions other than the gradient direction to an arbitrary covariance and calculates the lower bounds of the set covariances.

A knowledge tracing method according to the exemplary aspect of the present invention, implemented by a computer, includes determining a variational parameter that specifies a position where a likelihood function and a lower bound of the likelihood function to be approximated by Gaussian are in contact, generating a likelihood function made one-dimensional in a gradient direction at the center of a prior distribution and calculating the lower bound of the generated likelihood function, and setting covariances in directions other than the gradient direction to an arbitrary covariance and calculating the lower bounds of the set covariances.

A knowledge tracing program according to the exemplary aspect of the present invention, causes a computer to execute a variational parameter determination process of determining a variational parameter that specifies a position where a likelihood function and a lower bound of the likelihood function to be approximated by Gaussian are in contact, a gradient direction lower bound calculation process of generating a likelihood function made one-dimensional in a gradient direction at the center of a prior distribution and calculating the lower bound of the generated likelihood function, and a full dimensional lower bound calculation process of setting covariances in directions other than the gradient direction to an arbitrary covariance and calculating the lower bounds of the set covariances.

Advantageous Effects of Invention

According to the exemplary aspect of the present invention, it is possible to present a reliability of a prediction result while improving an explainability of a prediction reason even when knowledge tracing is performed in real time.

BRIEF DESCRIPTION OF DRAWINGS

FIG. 3 It depicts an explanatory diagram showing an example of a form of a likelihood function.

DESCRIPTION OF EMBODIMENTS

Figure 1:
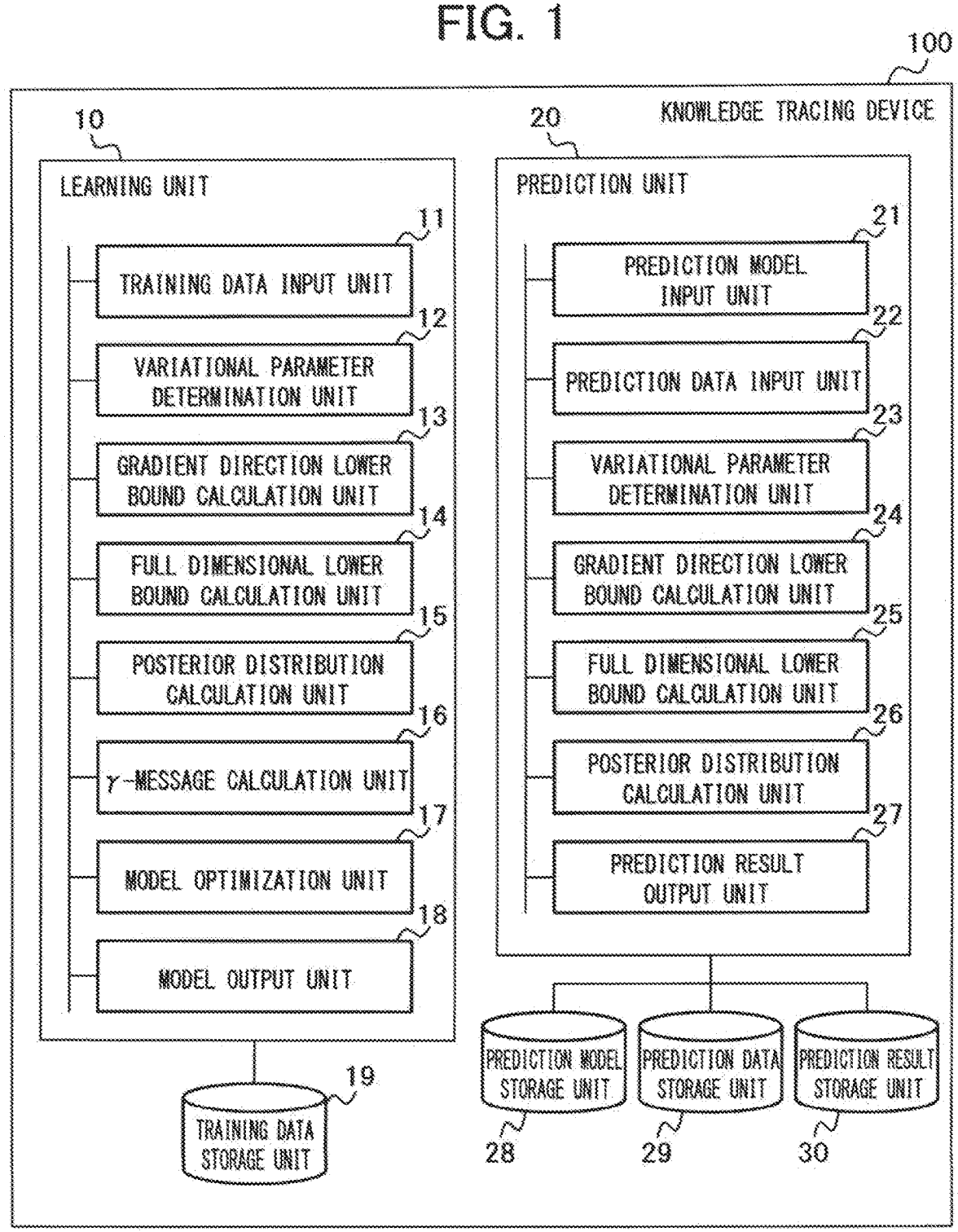
FIG. 1 It depicts a block diagram showing a configuration example of an exemplary embodiment of a knowledge tracing device according to the exemplary aspect of the present invention.

Hereinafter, exemplary embodiments of the present invention will be explained with reference to the drawings.

The present invention assumes a situation where knowledge tracing is performed in real time. It is an object of the present invention to present a reliability of a prediction result while improving an explainability (sometimes, referred to as interpretability) of a prediction reason.

Here, the explainability in the present invention will be explained. The explainability in the present invention means whether a model used for prediction (hereinafter, referred to as a prediction model) is represented by a compensation model or a non-compensation model. A compensatory model represents a model by which one skill can complement the other, while a non-compensation model represents a model by which one model cannot complement the other (in other words, the need for both skills is required).

Hereinafter, the explainability in the present invention will be explained with reference to specific examples. Here, a prediction model is assumed that shows whether a problem including an equation with fractions (for example, x/5+3/10=2x) can be solved or not. In order to solve this problem, it is assumed that skill $s_1$ in fractions and skill $s_2$ in equations are required.

In the compensation model, the model for predicting a correct answer probability is represented by a linear sum of each skill. For example, if the coefficients of each skill $s_1$ and $s_2$ are $a_1$ and $a_2$, respectively, the prediction model can be represented using a sigmoid function $\sigma$ as follows.

Correct answer probability=$\sigma(a_1 s_1 + a_2 s_2)$

On the other hand, in the non-compensation model, the model for predicting a correct answer probability is represented as a product of each skill. For example, if the coefficients of each skill $s_1$ and $s_2$ are $a_1$ and $a_2$, respectively, the prediction model can be represented using a sigmoid function $\sigma$ as follows.

Correct answer probability=$\sigma(a_1 s_1)\sigma(a_2 s_2)$

As mentioned above, the compensation model is capable of approximate estimation of the model parameters using the existing framework because a Gaussian approximation can be applied to a likelihood function as shown in above non-patent literature 4, but the explainability is low. In the compensation model, for example, since it may be interpreted as "if you have a high level of proficiency (skill) in fractions, you can solve the above problem without knowing the equations", explainability is low. On the other hand, in the non-compensation model, since it is interpreted as "if you do not have knowledge of fractions and equations, you cannot solve the above problem", explainability is high.

However, it is difficult to obtain the approximate solution analytically by the non-compensation model with high explainability because a Gaussian approximation can be applied to a likelihood function on the incorrect answer side using the method described in non-patent literature 4. In addition, when real-time prediction is assumed, Markov chain Monte Carlo methods (MCMC) cannot be used. Therefore, it is an object of the present invention to estimate the non-compensation model as well as a predictive distribution (knowledge state of a learner and probability of correctness of each problem) in real time, while maintaining the prediction accuracy.

FIG. 1 is a block diagram showing a configuration example of an exemplary embodiment of a knowledge tracing device according to the exemplary aspect of the present invention. A knowledge tracing device 100 of this exemplary embodiment has a learning unit 10 and a prediction unit 20.

The learning unit 10 includes a training data input unit 11, a variational parameter determination unit 12, a gradient direction lower bound calculation unit 13, a full dimensional lower bound calculation unit 14, a posterior distribution calculation unit 15, a γ-message calculation unit 16, a model optimization unit 17, and a model output unit 18. The learning unit 10 is connected to a training data storage unit 19. The learning unit 10 may include the training data storage unit 19.

The training data storage unit 19 stores training data used to learn a model. The learning unit 10 may receive the training data from an external device (not shown) through a communication line. In this case, the training data storage unit 19 does not have to store the training data. The contents of the training data will be described later.

The training data storage unit 19 may also store various parameters of the models to be learned in this exemplary embodiment. In this exemplary embodiment, learning is performed assuming three models (a probability model, a response model, and a state transition model). Hereinafter, the content of the models assumed in this exemplary embodiment will be explained.

The probability model assumed in this exemplary embodiment is a state space model that estimates the internal state of the model from observed data, and is a model similar to the Kalman filter. In this exemplary embodiment, the internal state represents the degree to which a learner (sometimes, referred to as a user) possesses each skill to solve a problem.

In the following explanation, a user index is denoted by j and a problem index is denoted by i. In addition, i(j, t) means a problem i that a user j has solved at time t. In addition, an index of a skill (skill index) required by a user to solve a problem is denoted by k. Correspondence of skills k required to solve a problem i is predefined as a problem skill map $Q_{i,k} \in \{0,1\}$.

Figure 2:
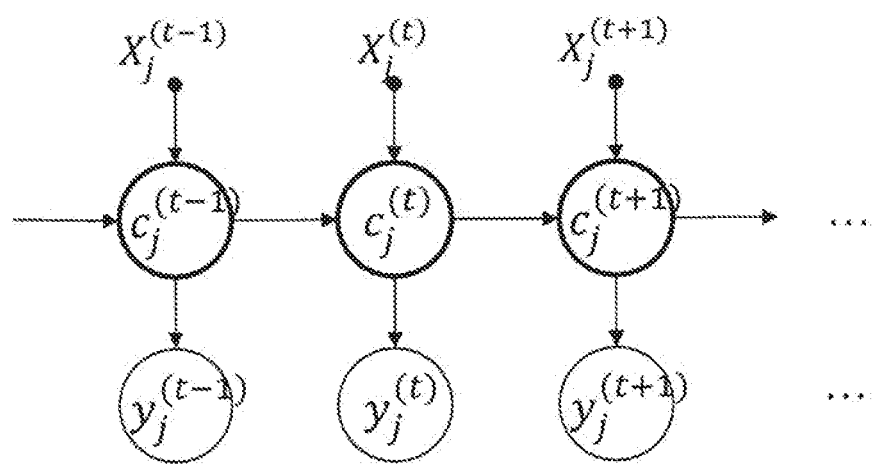
FIG. 2 It depicts an explanatory diagram showing an example of a probability model.

FIG. 2 is an explanatory diagram showing an example of a probability model. $c_j^{(t)} \in R^K$ illustrated in FIG. 2 is a random variable that represents the state of the user j at time t, and is a vector with K real values. $y_j^{(t)} \in \{0,1\}$ is a random variable that represents whether the user j can solve the problem or not at time t. $X_j^{(t)}$ is information regarding user j at time t, which is input as training data. The training data includes pre-designed features such as learning motivation of the user j, the degree of reference of user j for the field of the problem, and the time elapsed from the previous learning time, in addition to attributes of user j. The individual features that indicate the skill k of the user j at time t are represented by $x_{j,k}^{(t)}$ and are input as training data.

The response model is a model that represents the probability that a learner j can solve the problem when the state $c_j^{(t)}$ of the learner j at the time t and a problem i are given, and specifically, it is defined by Equation 1 illustrated below.

[Math. 1]

$$P(y_j^{(t)} = 1 \mid c_j^{(t)}) = \prod_k \sigma_{i,j,k}^{Q_{i,k}} \quad \text{(Equation 1)}$$

The model illustrated in Equation 1 is represented by the combination of skills k that the learner j needs to solve the problem i, and the probability of solving the problem is calculated by a product of each skill. The degree (proficiency) to which the learner j possesses the skill k required to solve a problem i is defined by Equation 2 below.

[Math. 2]

$$\sigma_{i,j,k} = \sigma(a_{i,k}(c_{j,k}^{(t)} - b_{i,k})) \quad \text{(Equation 2)}$$

In Equation 2, $b_{i,k}$ represents difficulty of a skill k used in a problem i, and $c_{j,k}^{(t)}$ represents the degree of the skill k of a learner j at time t. Note that $a_{i,k}$ is a parameter that represents the degree of rise (slope) of the skill k with respect to a problem i. Equation 2 indicates that if the skill $c_{i,k}^{(t)}$ is higher than difficulty indicated by $b_{i,k}$, the problem can be solved with a high probability.

In the general Kalman filter, the response model is represented by a Gaussian distribution, whereas in this exemplary embodiment, the response model is represented by a non-compensation model as shown in Equation 1 above unlike the general Kalman filter.

The state transition model is a model that transitions to the next state $c_j^{(t+1)}$ by the linear transformation D when the state $c_j^{(t)}$ of the user j at the time t is given. The state transition model of this exemplary embodiment is defined by Equation 3 below.

[Math. 3]

$$P(c_j^{(t+1)} \mid c_j^{(t)}) = N\left(c_j^{(t+1)} \mid D_{i(j,t)} c_j^{(t)} + \begin{bmatrix} \beta_1^T x_{j,1}^{(t+1)} \\ \cdots \\ \beta_k^T x_{j,k}^{(t+1)} \end{bmatrix}, \Gamma_{i(j,t+1)}\right) \quad \text{(Equation 3)}$$

$$P(c_j^{(1)}) = N(c_j^{(1)} \mid \mu_0, P_0)$$

In Equation 3, $D_{i(j,t)}$ represents a linear transformation that changes the state depending on the problem i solved by the user j at time t, and $\Gamma_{i(j,t+1)}$ represents a Gaussian noise. The second term on the right side is a bias term which represents a feature of the user j that can affect the state transition. The feature assumed in the bias term includes, for example, motivation of the user, the time interval since the previous problem was solved and so on.

For example, if the elapsed time is set to be linear, the skill of the learner will decrease linearly along the elapsed time. To prevent this, the decay can be defined by setting a value that follows the forgetting curve for x to the bias term, for example, thus, it becomes to be possible to fit whether the problem can be solved by the learning process described below when the skill decays with time. Note that $\beta_k$ is a coefficient representing the characteristics of each skill, and for example, a large negative value is set for the coefficient of a skill that is easily forgotten. Further, $\mu_0$ and $P_0$ represent the mean and variance of the Gaussian distribution of the initial state of a learner, respectively.

The learning unit 10 performs the learning process to obtain these parameters from the training data. Specifically, the learning unit 10 performs the learning using the EM (expectation-maximization) algorithm.

In this exemplary embodiment, the α-message (recurrence equation) of the E step is defined by Equation 4, shown below. In the example shown in FIG. 2, the α-message is the posterior distribution when given up to $y_j^{(t)}$.

[Math. 4]

$$\frac{C_t P(c_j^{(t)} \mid y_j^{(1)}, \ldots, y_j^{(t)})}{\hat{a}(c_j^{(t)})} = $$

$$P(y_j^{(t)} \mid c_j^{(t)}) \int P(c_j^{(t)} \mid c_j^{(t-1)}) \frac{P(c_j^{(t-1)} \mid y_j^{(1)}, \ldots, y_j^{(t-1)})}{\hat{a}(c_j^{(t-1)})} dc_j^{(t-1)}$$

(Equation 4)

As shown in Equation 4 above, the α-message at time t (the left side in Equation 4) is calculated by multiplying the integrated value obtained by multiplying the α-message at time t−1 by the state transition probability $P(c_j^{(t)}|c_j^{(t-1)})$, by the likelihood term (sometimes, referred to as a likelihood function) $P(y_j^{(t)}|c_j^{(t)})$. Equation 4 above can also be represented as Equation 5 below.

[Math. 5]

$$\frac{P(c_j^{(t)}|y_j^{(1)}, \ldots, y_j^{(t)})}{P(c_j^{(t)}|y_j^{(1)}, \ldots, y_j^{(t-1)})}, \quad y_j^{(t)} \propto P(y_j^{(t)}|c_j^{(t)})$$

(Equation 5)

As described above, in the general Kalman filter, the likelihood function is a Gaussian distribution, but in this exemplary embodiment, the likelihood function is a non-compensation model (a non-Gaussian distribution), thus, it cannot be calculated analytically as it is. Therefore, in this exemplary embodiment, the likelihood function is approximated by a Gaussian distribution to match the general Kalman filter algorithm. Specifically, quadratic approximation (Gaussian approximation) is applied to the lower bound of the log likelihood of the non-compensation model so that the prediction can be performed analytically.

The likelihood function used in this exemplary embodiment has a different form when $Y_j^{(t)}=1$ (i.e., a likelihood function when the problem is solvable) and when $Y_j^{(t)}=0$ (i.e., a likelihood function when the problem is not solvable). FIG. 3 is an explanatory diagram showing an example of a form of a likelihood function. The likelihood function 101 illustrated in FIG. 3 is the likelihood function for the case of $Y_j^{(t)}=1$, and the likelihood function 102 is the likelihood function for the case of $Y_j^{(t)}=0$.

The likelihood function for the case of $Y_j^{(t)}=1$ is represented in Equation 6 shown below.

[Math. 6]

$$P(Y_j^{(t)} = 1 \mid c_j^{(t)}) = \prod_k \sigma_{i,j,k}^{Q_{i,k}}$$

(Equation 6)

The likelihood function in the case of $Y_j^{(t)}=1$ can be approximated by a Gaussian using commonly known methods such as those described in non-patent literature 4, for example. On the other hand, the likelihood function in the case of $Y_j^{(t)}=0$ is represented by Equation 7 shown below.

[Math. 7]

$$P(Y_j^{(t)} = 0 \mid c_j^{(t)}) = 1 - \prod_k \sigma_{i,j,k}^{Q_{i,k}}$$

(Equation 7)

The likelihood function in the case of $Y_j^{(t)}=0$ is difficult to approximate by a Gaussian using commonly known methods such as those described in non-patent literature 4.

Incidentally, as illustrated in Equation 5 above, the posterior distribution is calculated by a product of the prior distribution and the likelihood function. Therefore, in the range where the value of the prior distribution is close to zero, no matter how large the value of the likelihood function is, the value of the posterior distribution becomes almost zero by multiplying. Therefore, when the purpose is to calculate the value of the posterior distribution, the effect of approximating the likelihood function in that range is considered to be low. Accordingly, in this exemplary embodiment, the non-compensation model is estimated by local approximation to the center of the prior distribution, while maintaining the prediction accuracy.

The training data input unit 11 receives input of training data. The training data input unit 11 may obtain the training data from the training data storage unit 19, or may receive the training data from an external device (not shown) through a communication line.

The variational parameter determination unit 12 determines a parameter (hereinafter, referred to as a variational parameter) that specifies a position where the likelihood function and the lower bound of the likelihood function to be approximated by Gaussian come in contact with each other. The method of Gaussian approximation of the likelihood function and the method of determining the variational parameter are described below.

The gradient direction lower bound calculation unit 13 generates a likelihood function made into a one-dimensional function in the gradient direction at the center of the prior distribution and calculates the lower bound of the generated likelihood function. The gradient direction is a direction in which the likelihood function goes up the most (has the highest rate of change). As described above, it is important to approximate the vicinity of the prior distribution as accurately as possible in this exemplary embodiment. For this reason, the gradient direction lower bound calculation unit 13 generates a vector of gradient directions at the center of the prior distribution and generates a likelihood function made into a one-dimensional function in the direction of the generated vector.

Figure 4A:
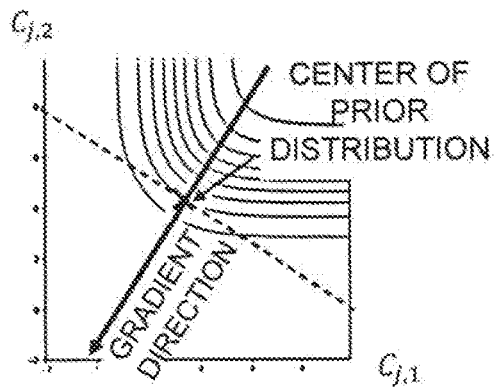
FIG. 4A It depicts an explanatory diagram showing an example of a method for generating a likelihood function that made one-dimensional in a gradient direction.
Figure 4B:
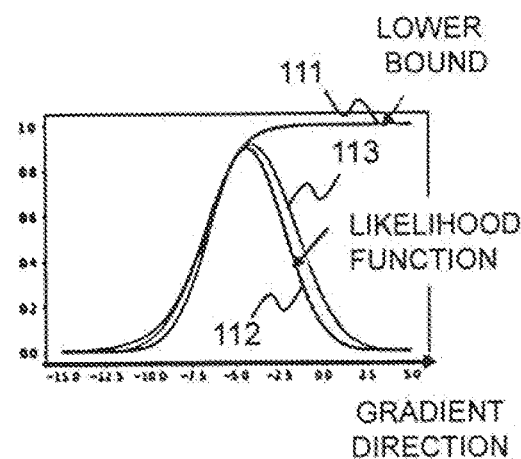
FIG. 4B It depicts an explanatory diagram showing an example of a method for generating a likelihood function that made one-dimensional in a gradient direction.

FIGS. 4A and 4B are explanatory diagrams showing an example of a method for generating a likelihood function that is made into a one-dimensional function in a gradient direction. Specifically, FIG. 4A shows a likelihood function as contour lines when viewed from directly above, and FIG. 4B shows a cross-unit of a gradient direction made one-dimensional. The curve 111 illustrated in FIG. 4B is a curve of the likelihood function, and the curves 112 and 113 are both curves that show the lower bounds of the likelihood function. The method of calculating the lower bound will be described later.

The full dimensional lower bound calculation unit 14 sets covariances in directions other than the gradient direction to an arbitrary covariance and calculates lower bounds of the set covariances. For example, the full dimensional lower bound calculation unit 14 may set covariances in directions other than the gradient direction to the variance of the prior distribution. The reason for setting covariances in directions other than the gradient direction to an arbitrary covariance is as follows.

As illustrated in FIGS. 4A and 4B, since the contour line of the likelihood function is a convex function, in the tangential direction of the center of the prior distribution, the likelihood function rises. Therefore, even if the variance of the multidimensional Gaussian distribution is widened, the variance always exists in a lower area to the likelihood function. In the first place, in the case of Gaussian approximation, the objective is to calculate a lower bound that will stick below the likelihood function. This is because it generates a function that suppresses the objective function of the EM algorithm from the lower side.

Considering the generation of a function that suppresses the objective function from the lower side, the variance in the horizontal direction (i.e., the direction perpendicular to the gradient direction) is arbitrary, as long as the variance can be fitted from the lower side in the gradient direction. Since the contour line is a convex function, in the gradient direction, the likelihood function will always go down as a Gaussian distribution, and in the orthogonal direction, the likelihood function will always go up.

In this exemplary embodiment, since the part with high prior distribution is approximated accurately and the likelihood function of the rest of the distribution is not known (it is arbitrary), variances in directions other than the gradient direction shall be adjusted to the variance of the prior distribution.

Figure 5A:
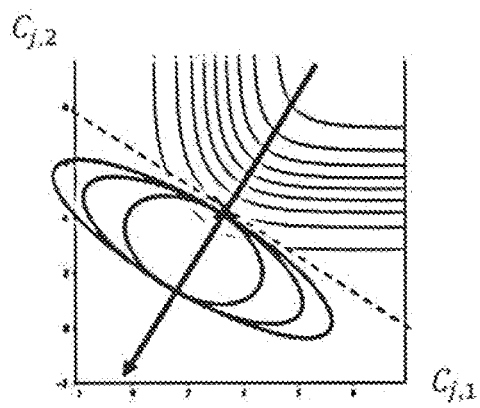
FIG. 5A It depicts an explanatory diagram showing an example of a method for calculating a lower bound in full dimension.
Figure 5B:
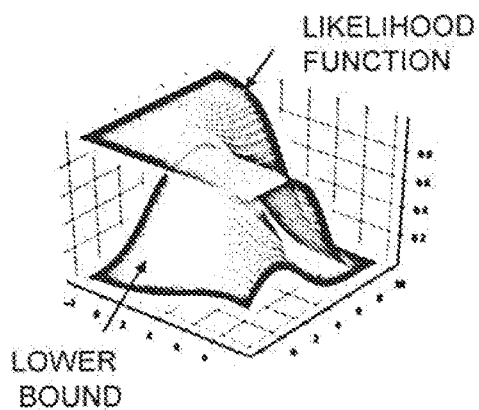
FIG. 5B It depicts an explanatory diagram showing an example of a method for calculating a lower bound in full dimension.

FIGS. 5A and 5B are explanatory diagrams showing an example of a method for calculating a lower bound in full dimension. As illustrated in FIG. 5A, even if the variance in the direction perpendicular to the gradient direction is widened, the variance always exists in a lower area to the likelihood function. As a result, the lower bound is calculated as illustrated in FIG. 5B. The calculation method of the lower bound will be described later.

The posterior distribution calculation unit 15 calculates the posterior distribution by multiplying the prior distribution with the likelihood function. The method of calculating the prior distribution is also described later.

The γ-message calculation unit 16 calculates a γ-message in the same way as the Kalman filter. Since the method by which the γ-message calculation unit 16 calculates a γ-message is well known, detailed description thereof will be omitted.

As the M step, the model optimization unit 17 calculates the parameters that maximize the lower bound of the likelihood function obtained in the E step. The model optimization unit 17 may, for example, optimize the parameters by a method similar to the Kalman filter. Specific examples of parameter optimization methods will be described later.

The model output unit 18 outputs an optimized model. The model output unit 18 may store the model in the prediction model storage unit 28 through the prediction model input unit 21 included in the prediction unit 20 described below.

The learning unit 10 (more specifically, the training data input unit 11, the variational parameter determination unit 12, the gradient direction lower bound calculation unit 13, the full dimensional lower bound calculation unit 14, the posterior distribution calculation unit 15, the γ-message calculation unit 16, the model optimization unit 17, and the model output unit 18) is realized by a processor (for example, CPU (Central Processing Unit), GPU (Graphics Processing Unit)) of a computer operating according to a program (a knowledge tracing program).

For example, the program may be stored in a storage unit (not shown), and the processor may read the program and operate according to the program as the learning unit 10 (more specifically, the training data input unit 11, the variational parameter determination unit 12, the gradient direction lower bound calculation unit 13, the full dimensional lower bound calculation unit 14, the posterior distribution calculation unit 15, the γ-message calculation unit 16, the model optimization unit 17, and the model output unit 18).

In addition, the functions of the learning unit 10 may be provided in the form of SaaS (Software as a Service).

The training data input unit 11, the variational parameter determination unit 12, the gradient direction lower bound calculation unit 13, the full dimensional lower bound calculation unit 14, the posterior distribution calculation unit 15, the γ-message calculation unit 16, the model optimization unit 17, and the model output unit 18 may each be realized by dedicated hardware. Some or all of the components of each device may be realized by general-purpose or dedicated circuit (circuitry), a processor, or combinations thereof. These may be configured by a single chip or by multiple chips connected through a bus. Some or all of the components of each device may be realized by a combination of the above-mentioned circuit, etc., and a program.

When some or all of the components of the learning unit 10 are realized by multiple information processing devices, circuits, etc., the multiple information processing devices, circuits, etc. may be centrally located or distributed. For example, the information processing devices, circuits, etc. may be realized as a client-server system, a cloud computing system, etc., each of which is connected through a communication network.

The training data storage unit 19 is realized by a magnetic disk, for example.

The prediction unit 20 includes a prediction model input unit 21, a prediction data input unit 22, a variational parameter determination unit 23, a gradient direction lower bound calculation unit 24, a full dimensional lower bound calculation unit 25, a posterior distribution calculation unit 26, a prediction result output unit 27, a prediction model storage unit 28, a prediction data storage unit 29, and a prediction result storage unit 30.

The prediction model storage unit 28 stores a prediction model.

The prediction data storage unit 29 stores data (prediction data) used for prediction. The prediction unit 20 may receive the prediction data from an external device (not shown) through a communication line. In this case, the prediction data storage unit 29 may not store the prediction data. The content of the prediction data is data that includes the same features as the training data.

The prediction result storage unit 30 stores prediction results. By storing the prediction results, it is possible to use the existing prediction result for the next prediction data.

The prediction model input unit 21 receives input of a model (prediction model) to be used for prediction. The prediction model input unit 21 then stores the received prediction model in the prediction model storage unit 28.

The prediction data input unit 22 receives input of prediction data. The prediction data input unit 22 may obtain the prediction data from the prediction data storage unit 29, or may receive the prediction data from an external device (not shown) through a communication line.

The variational parameter determination unit 23 determines variational parameters in the same way as the variational parameter determination unit 12. The gradient direction lower bound calculation unit 24 generates a likelihood function made one-dimensional in a gradient direction at the center of the prior distribution and calculates the lower bound of the generated likelihood function, in the same way as the gradient direction lower bound calculation unit 13.

The full dimensional lower bound calculation unit 25 sets covariances in directions other than the gradient direction to an arbitrary covariance and calculates lower bounds of the set covariances in the same way as the full dimensional lower bound calculation unit 14. The posterior distribution calculation unit 26 calculates the posterior distribution in the same way as the posterior distribution calculation unit 15.

The prediction result output unit 27 outputs prediction result.

The prediction unit 20 (more specifically, the prediction model input unit 21, the prediction data input unit 22, the variational parameter determination unit 23, the gradient direction lower bound calculation unit 24, the full dimensional lower bound calculation unit 25, the posterior distribution calculation unit 26, and the prediction result output unit 27) is realized by a processor of a computer operating according to a program (a prediction program).

When some or all of the components of the prediction unit 20 are realized by multiple information processing devices, circuits, etc., the multiple information processing devices, circuits, etc. may be centrally located or distributed in the same manner as the learning unit 10. Furthermore, each of the components included in the learning unit 10 and the prediction unit 20 may be centrally located in the same information processing device or circuit, or may be distributed in different information processing devices. That is, the learning unit 10 and the prediction unit 20 included in the knowledge tracing device 100 of this exemplary embodiment may be respectively realized by different information processing devices, and these information processing devices may be centrally located or distributed.

The prediction model storage unit 28, the prediction data storage unit 29, and the prediction result storage unit 30 are realized by a magnetic disk, for example.

Next, the specific methods of the various calculations will be explained. First, the method of calculating an α-message is explained. The α-message is calculated by a product of prior distribution and likelihood function, as shown in Equation 5 above. The prior distribution is calculated by multiplying the previous α-message by the state transition probability. The prior distribution is calculated by Equation 8, for example, which is illustrated below. The calculation of the prior distribution can be done analytically because of the calculation between Gaussian distributions.

[Math. 8]

$$P(c_j^{(t)} | y_j^{(1)}, \ldots, y_j^{(t-1)}) =$$
$$\int \hat{\alpha}(c_j^{(t-1)}) P(c_j^{(t)} | c_j^{(t-1)}) dc_j^{(t-1)} = \int N(c_j^{(t-1)} | \mu_j^{(t-1)}, V_j^{(t-1)})$$
$$N\left(c_j^{(t)} \Big| D_{i(j,t-1)} c_j^{(t-1)} + \begin{bmatrix} \beta_1^T x_{j,1}^{(t)} \\ \ldots \\ \beta_k^T x_{j,k}^{(t)} \end{bmatrix}, \Gamma_{i(j,t)}\right) dc_j^{(t-1)} \Gamma_{i(j,t)}$$
$$dc_j^{(t-1)} = N(c_j^{(t)} | m_j^{(t)}, G_j^{(t)})$$
$$\begin{cases} m_j = D_{i(j,t-1)} \mu_j^{(t-1)} + \begin{bmatrix} \beta_1^T x_{j,1}^{(t)} \\ \ldots \\ \beta_k^T x_{j,k}^{(t)} \end{bmatrix} \\ G_j^{(t)} = D_{i(j,t-1)} V_j^{(t-1)} D_{i(j,t-1)}^T + \Gamma_{i(j,t)} \end{cases}$$

(Equation 8)

In Equation 8, $m_j^{(t)}$ represents the mean, and $G_j^{(t)}$ represents the covariance matrix. In this exemplary embodiment, the posterior distribution calculation unit 15 may calculate the prior distribution.

Next, the method by which the posterior distribution calculation unit 15 calculates the posterior distribution will be explained in detail. As described above, the posterior distribution is calculated by a product of the prior distribution and the likelihood function. However, not all the skills associated with solving a problem are necessarily required. Therefore, it is necessary to consider possibility that the likelihood function may be a function that does not include dimensions of all the skills (i.e., using some of the skills).

Therefore, the skill part is decomposed and the posterior distribution q is defined as shown in Equation 9 below. In Equation 9, the vector $c_a$ represents the skill part to be updated, and the vector $c_b$ represents the remaining skill part.

[Math. 9]

$$q(c_a, c_b) \propto p(c_b | c_a) p(c_a) f(c_a)$$

(Equation 9)

This likelihood function is a function corresponding to $c_a$ because it only includes the skills used in the problem that has been learned. Therefore, the posterior distribution calculation unit 15 first calculates the posterior distribution in the $p(c_a)f(c_a)$ part. Since the conditional probability $p(c_b|c_a)$ of Gaussian distribution is also Gaussian distribution, the final posterior distribution is also Gaussian distribution. In this way, the posterior distribution calculation unit 15 first calculates the marginal likelihood of the part of the prior distribution $p(c_b|c_a)$ that is related to the problem solved this time, and then calculates the posterior distribution using the marginal likelihood and the distribution approximated by Gaussian, further, calculates the final posterior distribution by multiplying the calculated posterior distribution by the Gaussian distribution $p(c_b|c_a)$.

First, the state $c_j^{(t)}$, the mean $m_j^{(t)}$, and the covariance matrix $G_j^{(t)}$ are defined as shown in Equation 10 below, respectively.

[Math. 10]

$$c_j^{(t)} = \begin{bmatrix} c_a \\ c_b \end{bmatrix} \quad m_j^{(t)} = \begin{bmatrix} m_a \\ m_b \end{bmatrix} \quad G_j^{(t)} = \begin{bmatrix} G_{a,a} & G_{a,b} \\ G_{b,a} & G_{b,b} \end{bmatrix}$$

(Equation 10)

In addition, with respect to the prior distribution, the marginal distribution of the skill part related to $Q_{i(j,t)}$ is $N(c_a | m_a, G_{a,a})$. The posterior distribution calculation unit 15 approximates the posterior distribution with a Gaussian distribution by performing a Gaussian approximation of the likelihood function and calculating the approximation of the posterior distribution with respect to $c_a$.

As described above, when $Y_j^{(t)}=1$, the likelihood function of the non-compensation model can be approximated by Gaussian using the method described in non-patent literature 4, for example. On the other hand, when $Y_j^{(t)}=0$, the Gaussian approximation of the likelihood function of the non-compensation model can be calculated by the method described below (the variational parameter determination unit 12, the gradient direction lower bound calculation unit 13, and the full dimensional lower bound calculation unit 14).

That is, from $f(c_a) \approx N(\cdot | \eta, \psi)$, $q(c_a) \propto p(c_a)f(c_a)$, the posterior distribution is $q(c_a) = N(c_a | m'_a, G'_{a,a})$. Here, the mean $m'_a$ and variance $G'_{a,a}$ are defined below, respectively.

$$m'_a = (G_{a,a}^{-1} + \psi^{-1})^{-1}(G_{a,a}^{-1} m_a + \psi^{-1} \eta)$$

$$G'_{a,a} = (G_{a,a}^{-1} + \psi^{-1})^{-1}$$

[Math. 11]

The posterior distribution $\alpha\hat{}(c_j^{(t)})=q(c_a, c_a)$ is calculated as shown in Equation 11 below. Note that $\alpha\hat{}$ is the superscript hat ($\hat{}$) of $\alpha$.

[Math. 12]

$$\mu_j^{(t)} = \begin{bmatrix} m'_a \\ m_b + G_{b,a}G_{a,a}^{-1}(m'_a - m_a) \end{bmatrix}$$

$$V_j^{(t)} = \begin{bmatrix} G'_{a,a} & G'_{a,a}G_{a,a}^{-1}G_{a,b} \\ G_{b,a}G_{a,a}^{-1}G'_{a,a} & G_{b,b} - G_{b,a}(G_{a,a}^{-1}G'_{a,a}G_{a,a}^{-1} - G_{a,a}^{-1})G_{a,b} \end{bmatrix}$$

(Equation 11)

Next, the calculation method of the lower bound in the gradient direction by the gradient direction lower bound calculation part 13 will be explained. The likelihood function in the case of $Y_j^{(t)}=0$ can be represented as shown in Equation 12 below. However, as explained above for Equation 7, it is difficult to simply approximate Equation 12 as Gaussian.

[Math. 13]

$$P(y=0 \mid c_a, Q_i) = 1 - \prod_k \sigma_{i,k}$$

(Equation 12)

Incidentally, Equation 12 shown above can be said to be an equation that represents a probability of a complementary event. For example, when there are two skills, the probability of having two skills corresponds to the probability of $Y_j^{(t)}=1$, and the probability of not having at least one skill of corresponds to the probability of $Y_j^{(t)}=0$. The situation of not having at least one skill is, in other words, the situation of not having both or either of the skills. Therefore, the situation of $Y_j^{(t)}=0$ can be rewritten as a sum of products of sigmoid functions.

Hereinafter, in order to simplify the explanation, it is assumed that there are two skills (K=2). when K=2, the equation 12 shown above can be expanded as follows.

$$1-\sigma_1\sigma_2=\overline{\sigma_1\sigma_2}+\overline{\sigma_1}\sigma_2+\sigma_1\overline{\sigma_2} \text{ wherein } \overline{\sigma}(x)=\sigma(-x)$$ [Math. 14]

The above equation can be represented in two-bit notation. Specifically, the sigmoid function with a bar can be associated with "0" and the sigmoid function without a bar can be associated with "1".

With respect to the sigmoid function with/without a bar, in the case the function to get the k-th bit when the decimal number 1 is represented in binary is defined as $bin(1)_k$, and Equation 12 shown above can be expanded by multiplying the sigmoid functions as shown in Equation 13 below.

[Math. 15]

$$\sum_{l=1}^{2^{K_i}-1} \prod_k \sigma((2bin(l)_k - 1)(a_{i,k}(C_{a,k} - b_{i,k})))$$

(Equation 13)

Figure 6:
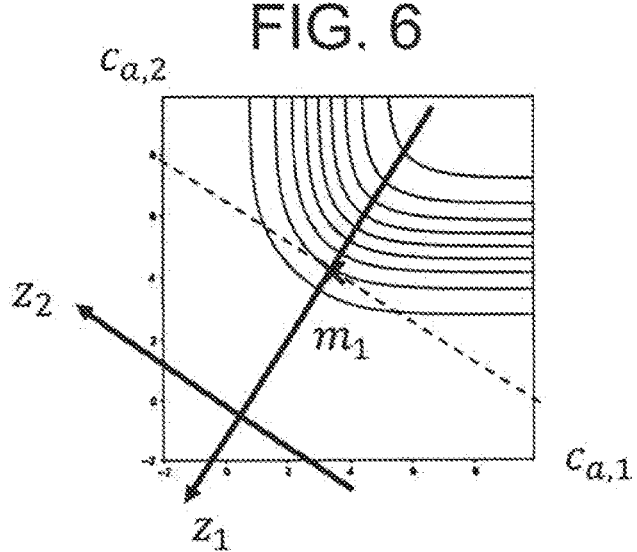
FIG. 6 It depicts an explanatory diagram showing an example of a process of calculating a lower bound in a gradient direction.

The gradient direction lower bound calculation unit 13 makes the calculated likelihood function one-dimensional in the gradient direction. FIG. 6 is an explanatory diagram showing an example of a process of calculating a lower bound in a gradient direction. First, the gradient direction lower bound calculation unit 13 calculates the gradient of the likelihood function. As illustrated in FIG. 6, if the center of the prior distribution is mi, the gradient $\nabla p(y \mid c_a, Q_i)$ can be calculated by the following equation 14.

[Math. 16]

$$\frac{\partial}{\partial c_{a,r}} p(y=0 \mid c_a, Q_i) =$$

$$\frac{\partial}{\partial c_{a,r}}\left(1 - \prod_k \sigma_{i,k}\right) = -\left(\prod_k \sigma_{i,k}\right)(1 - \sigma_{i,r})a_{i,r}$$

(Equation 14)

Since the direction other than the gradient direction is arbitrary as long as the coordinate system is orthogonal, the gradient direction lower bound calculation unit 13 calculates the vector other than the gradient by a method of calculating the vector of the orthogonal system from the given vector (for example, Schmidt orthonormalization), for example. As a result, since the c coordinate system and the z coordinate system can be calculated, the transformation of both coordinate systems can be represented by using the transformation matrix W. Specifically, the transformation between the c coordinate system and the z coordinate system can be performed using Equation 15 shown below. W is the orthonormal basis and satisfies the following relationship with the W with underbar in Equation 15.

[Math. 17]

(Equation 15)

$$c = W\left(z + \begin{bmatrix} 0 \\ \underline{W}^T m_1 \end{bmatrix}\right)$$

$$W^T = \begin{pmatrix} \phantom{xxx} \\ \underline{W}^T \\ \phantom{xxx} \end{pmatrix} \leftarrow \nabla p(y|c_a, Q_i)|_{m_1}$$

Since Equation 13 shown above is represented in the c coordinate system, the gradient direction lower bound calculation unit 13 converts the function shown in Equation 13 into the z coordinate system. In addition, by setting the value of z other than $z_1$ to 0, it is possible to make the function one-dimensional in the gradient direction z1. Since $c_{a,k}$ can be represented by the following Equation 16, the gradient direction lower bound calculation unit 13 substitutes the following $c_{a,k}$ into Equation 13. As a result, Equation 17 shown below is obtained.

[Math. 18]

$$c_{a,k} = w_{k,:}^T \begin{bmatrix} z_1 \\ \underline{W}^T m_1 \end{bmatrix} = w_{k,1}z_1 + w_{k,2}^T \underline{W}^T m_1$$

(Equation 16)

$$\sum_{l=1}^{2^{K_i}-1} \prod_{k \in Q_i} \sigma((2bin(l)_k - 1)(a_{i,k}(w_{k,1}z_1 + q_{k,2}^T \underline{W}^T m - b_{i,k})))$$

(Equation 17)

Here, in order to clarify the coefficient in $z_1$ and the bias term, Equation 17 shown above is converted into Equation 18 shown below. Note that no approximation process is applied to the equation expansion up to Equation 18.

[Math. 19]

$$\sum_{l=1}^{2^{K_i}-1} \prod_k \sigma(\tilde{a}_{l,i,k}z_1 - \tilde{b}_{l,i,k})$$

(Equation 18)

-continued $$\tilde{a}_{l,i,k} = (2bin(l)_k - 1)a_{i,k}w_{k,1}$$

$$\tilde{b}_{l,i,k} = -(2bin(l)_k - 1)a_{i,k}(w_{k,2:}^T \underline{W}^T m_1 - b_{i,k})$$

Next, the gradient direction lower bound calculation unit 13 calculates the lower bound of Equation 18 above using the general method of Gaussian approximation of the sigmoid function (for example, the method described in non-patent literature 4). The lower bound of Equation 18 is calculated as shown in Equation 19 below.

[Math. 20]

$$\sigma(z) \geq \sigma(\xi)\exp\left(-\lambda(\xi)z^2 + \frac{1}{2}z + \lambda(\xi)\xi^2 - \frac{\xi}{2}\right) \geq \sum_{l=1}^{2^{K_i-1}} \prod_k \sigma(\xi_{l,k}) \quad \text{(Equation 19)}$$

$$\exp\left(\begin{array}{c} -\lambda(\xi_{l,k})\tilde{a}_{l,i,k}^2 z_1^2 + \left(2\lambda(\xi_{l,k})\tilde{a}_{l,i,k}\tilde{b}_{l,i,k} + \frac{1}{2}\tilde{a}_{l,i,k}\right)z_1 + \\ \lambda(\xi_{l,k})\left(\xi_{l,k}^2 - \tilde{b}_{l,i,k}^2\right) - \frac{1}{2}(\xi_{l,k} + \tilde{b}_{l,i,k}) \end{array}\right)$$

wherein $\xi_{l,k} = \tilde{a}_{l,i,k}\xi - \tilde{b}_{l,i,k}$ (The unknown number is $\xi$ only)

When the coefficient for $z_1^2$ in Equation 19 is $A_l$, the coefficient for $z_1$ is $B_l$, and the other coefficients are $C_l$, Equation 19 is converted as shown in Equation 20 below.

[Math. 21]

$$\sum_{l=1}^{2^{K_i-1}}\left(\prod_k \sigma(\xi_{l,k})\right)\exp(-A_l z_1^2 + B_l z_1 + C_l) \quad \text{(Equation 20)}$$

$$A_l = \sum_k \lambda(\xi_{l,k})\tilde{a}_{l,i,k}^2$$

$$B_l = \sum_k 2\lambda(\xi_{l,k})\tilde{a}_{l,i,k}\tilde{b}_{l,i,k} + \frac{1}{2}\tilde{a}_{l,i,k}$$

$$C_l = \sum_k \lambda(\xi_{l,k})(\xi_{l,k}^2 - \tilde{b}_{l,i,k}^2) - \frac{1}{2}(\xi_{l,k} + \tilde{b}_{l,i,k})$$

The gradient direction lower bound calculation unit 13 calculates the quadratic lower bound of the log likelihood of the equation shown in Equation 20. Specifically, the gradient direction lower bound calculation unit 13 approximates the quadratic lower bound of the log likelihood by applying Jensen's inequality to Equation 20. As a result, Equation 20 shown above can be represented as a quadratic equation for z, as shown in Equation 21 below.

[Math. 22]

$$\geq \sum_{l=1}^{2^{K_i-1}} q_l \ln\left(\frac{\left(\prod_{k \in Q_i} \sigma(\xi_{l,k})\right)\exp(-A_l z_1^2 + B_l z_1 + C_l)}{q_l}\right) =$$

$$\sum_{l=1}^{2^{K_i-1}} q_l\left(-A_l z_1^2 + B_l z_1 + C_l - \ln(q_l) + \sum_{k \in Q_i} \ln(\sigma(\xi_{l,k}))\right) =$$

$$-\left(\sum_{l=1}^{2^{K_i-1}} q_l A_l\right)z_1^2 + \left(\sum_{l=1}^{2^{K_i-1}} q_l B_l\right)z_1 + \sum_{l=1}^{2^{K_i-1}} q_l\left(C_l - \ln(q_l) + \sum_{k \in Q_i} \ln(\sigma(\xi_{l,k}))\right)$$

In addition, $q_l$ in Equation 21 can be represented as Equation 22 shown below by using the normalization constant G.

[Math. 23]

$$q_l = \frac{\left(\prod_{k \in Q_i} \sigma(\xi_{l,k})\right)\exp(-A_l \xi^2 + B_l \xi + C_l)}{G} \quad \text{(Equation 22)}$$

By completing the square of Equation 21, a one-dimensional Gaussian function can be derived, and the center in the z-coordinate system can be derived.

Next, a method of calculating the lower bounds of covariances in directions other than the gradient direction by the full dimensional lower bound calculation unit 14 will be explained. The calculation is also performed except for the gradient direction in the z-coordinate system. First, the full dimensional lower bound calculation unit 14 converts the prior distribution in the c coordinate system shown in $p(c_a)$ of Equation 9 above to the z coordinate system, and then calculates a covariance matrix other than the covariance in the gradient direction ($z_1$). Specifically, the conversion (c=$W_z$) to the z-coordinate system is performed for $p(c_a)$ of Equation 9 shown above. As a result, Equation 23 shown below is obtained.

[Math. 24]

$$-1/2(z-W^T m)^T W^T G_{a,a}^{-1} W(z-W^T m) \quad \text{(Equation 23)}$$

When the precision matrix $\Lambda=W^T G_{a,a}^{-1} W$ is set, Equation 24 shown below is obtained as the precision matrix of the distribution in which the prior distribution is marginalized with respect to $Z_1$ by the conversion of the Schur complement.

[Math. 25]

$$\Lambda_{2:K,2:K} - \Lambda_{2:K,1}\Lambda_{1,1}^{-1}\Lambda_{1,2:K} \quad \text{(Equation 24)}$$

Figure 7:
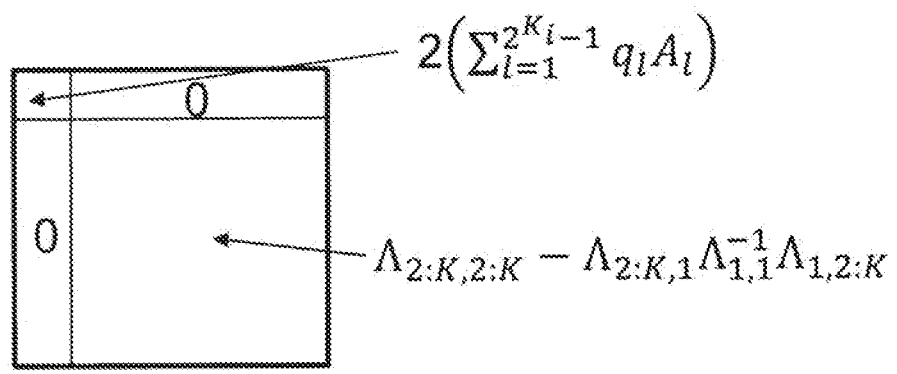
FIG. 7 It depicts an explanatory diagram showing an example of a precision matrix of a multi-dimensional lower bound in z coordinate system.

FIG. 7 is an explanatory diagram showing an example of a precision matrix of a multidimensional lower bound in z coordinate system. With the conversion described above, the contents of the first row and first column of the precision matrix are represented by Equation 25 shown below, and the contents of the second to Kth rows and the contents of the second to Kth row are represented by Equation 24 shown above.

[Math. 26]

$$2\left(\sum_{l=1}^{2^{K_i-1}} q_l A_l\right) \quad \text{(Equation 25)}$$

The mean is represented by Equation 26, shown below. As a result, the lower bound in the z-coordinate system is calculated.

[Math. 27]

$$\begin{bmatrix} \frac{\sum_{l=1}^{2^{K_i-1}} q_l B_l}{2\left(\sum_{l=1}^{2^{K_i-1}} q_l A_l\right)} \\ 0 \end{bmatrix} \quad \text{(Equation 26)}$$

Next, the full dimensional lower bound calculation unit 14 performs a conversion (z=$W^T c$) from the z coordinate system to the c coordinate system. As a result, the precision matrix of the multi-dimensional lower bound in the c coordinate system shown in Equation 27 below and the mean of the multi-dimensional lower bound in the c coordinate system shown in Equation 28 is calculated.

[Math. 28]

$$\Psi^{-1} = W \begin{bmatrix} 2\left(\sum_{l=1}^{2^{K_i}-1} q_l A_l\right) & 0 \\ 0 & \Lambda_{2:K,2:K} - \Lambda_{2:K,1}\Lambda_{1,1}^{-1}\Lambda_{1,2:K} \end{bmatrix} W^T \quad \text{(Equation 27)}$$

$$\eta = W \begin{bmatrix} \sum_{l=1}^{2^{K_i}-1} q_l B_l / 2 \left(\sum_{l=1}^{2^{K_i}-1} q_l A_l\right) \\ \underline{W}^T m_1 \end{bmatrix} \quad \text{(Equation 28)}$$

Next, a method of determining the variational parameter $\xi$ (i.e., which part of the likelihood function should be fitted and the Gaussian approximation is performed) by the variational parameter determination unit 12 will be explained. Here, two methods are explained.

The first method is a heuristic search method. Specifically, the variational parameter determination unit 12 sets the center of the prior distribution when the likelihood is greater than a predetermined threshold (for example, 0.95), and when the likelihood is less than the threshold, the variational parameter may be obtained by searching until the threshold is exceeded by linear search.

As a second method, the variational parameter determination unit 12 may determine the variational parameter $\xi$ by differentiating and optimizing marginal likelihood. The variational parameter determination unit 12 may search for the variational parameter using Equation 29 shown below, for example.

[Math. 29]

$$\frac{\partial}{\partial \xi} \ln\left(\int p(Y \mid z) p(z) dz\right) \quad \text{(Equation 29)}$$

Next, a parameter optimization method by the model optimization unit 17 will be explained. The model optimization unit 17 calculates the parameters that maximize the lower bound of the likelihood function. The model optimization unit 17 may maximize the objective function shown in Equation 30 below for each parameter $\mu_0$, $P_0$, $\Gamma_i$, $D_i$, $\beta_k$, $a_{i,k}$, $b_{i,k}(\forall i,k)$, for example.

[Math. 30]

$$E\left[\sum_j \left\{\ln P(c_j^{(1)}) + \sum_{t=2}^{T_j} \ln P(c_j^{(t)} \mid c_j^{(t-1)}) + \sum_{t=1}^{T_j} \ln P(y_j^{(t)} \mid c_j^{(t)})\right\}\right] \quad \text{(Equation 30)}$$

In Equation 30, the model optimization unit 17 may optimize the parameters (i.e., $\mu_0$, $P_0$, $\Gamma$, $D_i$, $\beta_k$) included in the first and second terms in parentheses in the same way as the Kalman filter. The model optimization unit 17 may maximize the parameters (i.e., $a_{i,k}$, $b_{i,k}$) included in the third term in parentheses by calculating the lower bound using Jaakkola's inequality as described in non-patent literature 4 and Jensen's inequality described above, and analytically finding a solution in which the derivative of the calculated equation is zero.

Figure 8:
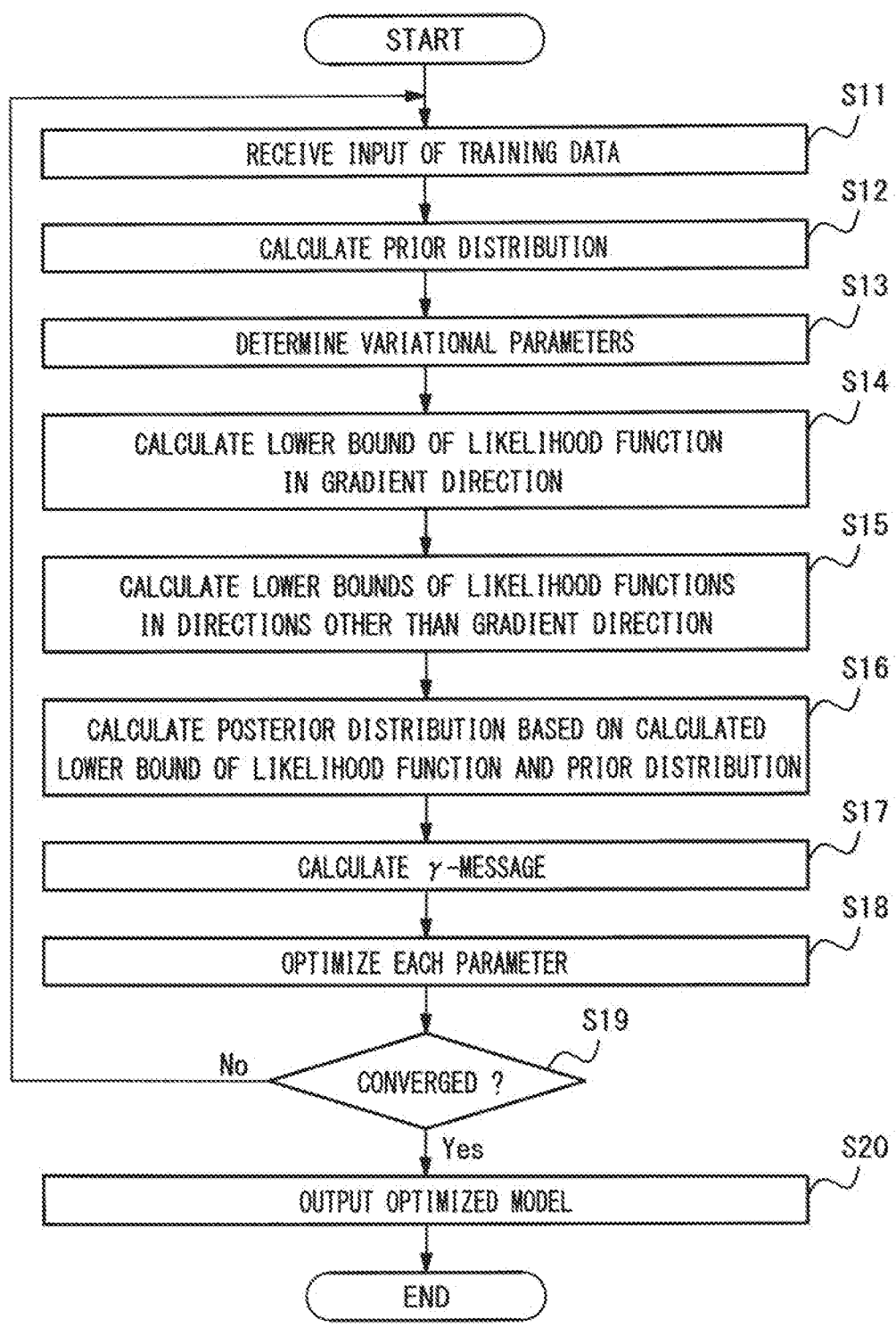
FIG. 8 It depicts a flowchart showing an operation example of a learning unit.

Next, the operation of the knowledge tracing device 100 of this exemplary embodiment will be explained. FIG. 8 is a flowchart showing an operation example of the learning unit 10 of this exemplary embodiment. First, the training data input unit 11 receives input of the training data required for model optimization (step S11). Next, the processes from step S12 to step S16 are performed to generate the α-message.

Specifically, the posterior distribution calculation unit 15 calculates a prior distribution (step S12). The variational parameter determination unit 12 determines the variational parameters (step S13). The gradient direction lower bound calculation unit 13 calculates the lower bound of the likelihood function in the gradient direction (step S14). The full dimensional lower bound calculation unit 14 calculates lower bounds of likelihood functions in directions other than the gradient direction (step S15). Then, the posterior distribution calculation unit 15 calculates a posterior distribution based on the calculated lower bound of the likelihood function and the prior distribution (step S16).

The γ-message calculation unit 16 calculates the γ-message (step S17). The model optimization unit 17 optimizes each model by optimizing each parameter (step S18). Then, the model optimization unit 17 determines whether the changes in the parameters have converged or not (step S19). when the changes have not converged (N in step S19), the processes from step S11 onward are repeated. On the other hand, when the changes have converged (Y in step S19), the model output unit 18 outputs the optimized model (step S20).

Figure 9:
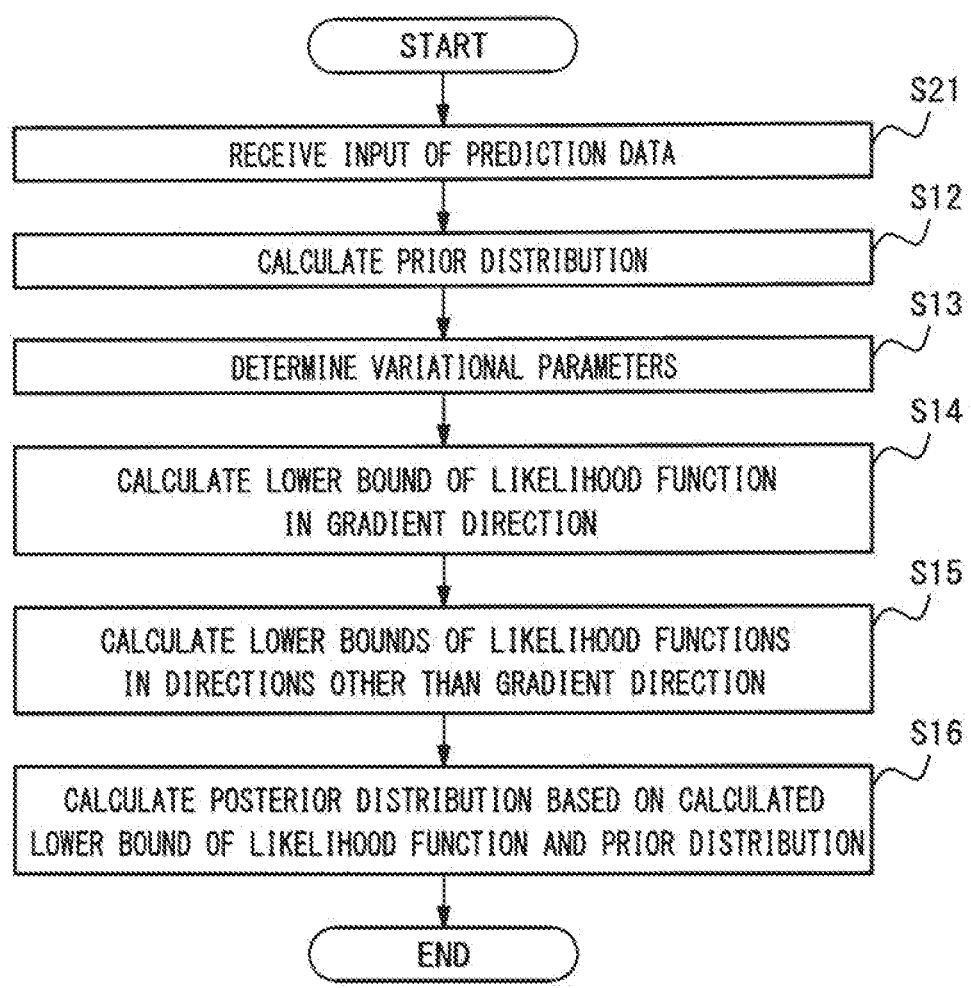
FIG. 9 It depicts a flowchart showing an operation example of a prediction unit.

FIG. 9 is a flowchart showing an operation example of the prediction unit 20 of this exemplary embodiment. The prediction data input unit 22 receives input of prediction data (step S21). Thereafter, the processes for generating the α-message are the same as the processes from step S12 to step S16 illustrated in FIG. 8.

As described above, in this exemplary embodiment, the variational parameter determination unit 12 determines a variational parameter that specifies a position where a likelihood function and a lower bound of a Gaussian-approximated likelihood function are in contact, and the gradient direction lower bound calculation unit 13 generates a likelihood function made one-dimensional in a gradient direction at the center of a prior distribution and calculates a lower bound of the generated likelihood function. Then, the full dimensional lower bound calculation unit 14 sets covariances in directions other than the gradient direction to an arbitrary covariance and calculates lower bounds of the set covariances. Therefore, since the non-compensation model can be estimated including the predictive distribution, it is possible to present a reliability of a prediction result while improving an explainability of a prediction reason even when knowledge tracing is performed in real time.

Figure 10:
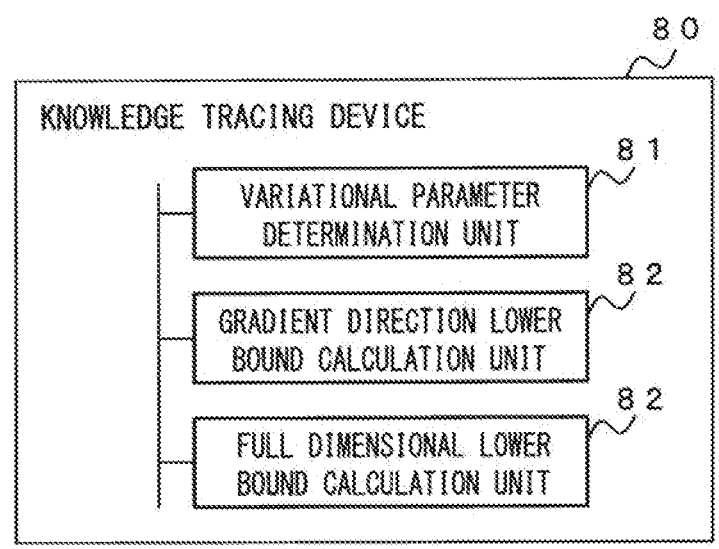
FIG. 10 It depicts a block diagram showing an overview of a knowledge tracing device.

Next, an overview of the present invention will be explained. FIG. 10 is a block diagram showing an overview of a knowledge tracing device according to the exemplary aspect of the present invention. A knowledge tracing device 80 (for example, the knowledge tracing device 100) according to the exemplary aspect of the present invention comprises a variational parameter determination unit 81 (for example, the variational parameter determination unit 12) which determines a variational parameter (for example, a variational parameter $\xi$) that specifies a position where a likelihood function and a lower bound of the likelihood function to be approximated by Gaussian are in contact, a gradient direction lower bound calculation unit 82 (for example, the gradient direction lower bound calculation unit 13) which generates a likelihood function made one-dimensional in a gradient direction at the center of a prior distribution and calculates the lower bound of the generated likelihood function, and a full dimensional lower bound calculation unit 83 (for example, the full dimensional lower bound calculation unit 14) which sets covariances in directions other than the gradient direction to an arbitrary covariance and calculates the lower bounds of the set covariances.

By such a configuration, it is possible to present a reliability of a prediction result while improving an explainability of a prediction reason even when knowledge tracing is performed in real time.

Specifically, the full dimensional lower bound calculation unit 83 may set the covariances in directions other than the gradient direction to the variance of a prior distribution.

The variational parameter determination unit 81 may determine a position where likelihood exceeds a predetermined threshold or a position obtained by optimizing differentiation of marginal likelihood, as the variational parameter.

The likelihood function may be represented as a product (for example, Equation 1 shown above) of functions that represent skills required by a learner to solve a problem.

The knowledge tracing device 80 may comprise a posterior distribution calculation unit (for example, the posterior distribution calculation unit 15) which generates an α-message in the Kalman filter by multiplying the lower bound of the calculated likelihood function with the prior distribution.

The posterior distribution calculation unit may generate the α-message using a state transition model (for example, Equation 3 shown above) in which a bias term representing a feature of a learner is included in a mean of a Gaussian distribution.

Figure 11:
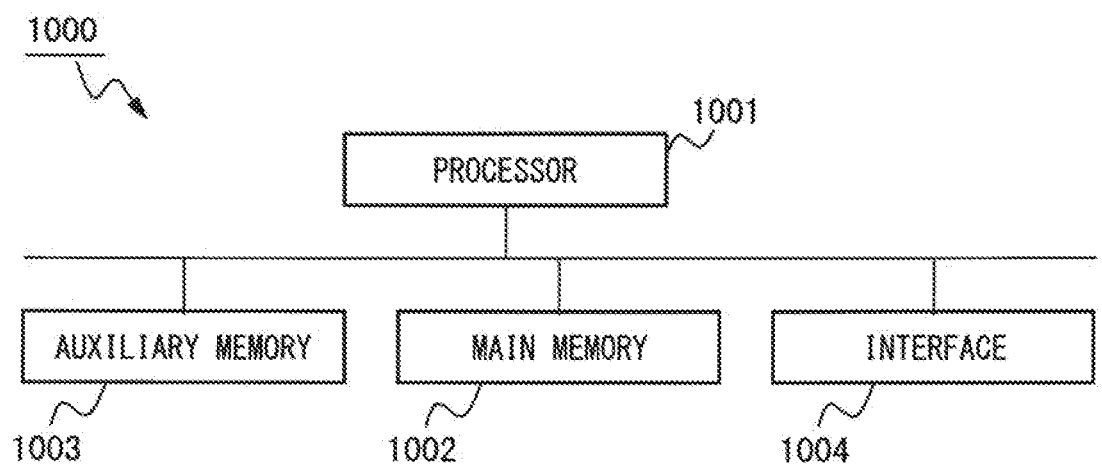
FIG. 11 It depicts a summarized block diagram showing a configuration of a computer for at least one exemplary embodiment.

FIG. 11 is a summarized block diagram showing a configuration of a computer for at least one exemplary embodiment. The computer 1000 comprises a processor 1001, a main memory 1002, an auxiliary memory 1003, and an interface 1004.

The knowledge tracing device 80 described above is implemented in the computer 1000. The operation of each of the above mentioned processing units is stored in the auxiliary memory 1003 in a form of a program (knowledge tracing program). The processor 1001 reads the program from the auxiliary memory 1003, deploys the program to the main memory 1002, and implements the above described processing in accordance with the program.

In at least one exemplary embodiment, the auxiliary memory 1003 is an example of a non-transitory tangible medium. Other examples of non-transitory tangible media include a magnetic disk, an optical magnetic disk, a CD-ROM (Compact Disc Read only memory), a DVD-ROM (Read-only memory), a semiconductor memory, and the like. When the program is transmitted to the computer 1000 through a communication line, the computer 1000 receiving the transmission may deploy the program to the main memory 1002 and perform the above process.

The program may also be one for realizing some of the aforementioned functions. Furthermore, said program may be a so-called differential file (differential program), which realizes the aforementioned functions in combination with other programs already stored in the auxiliary memory 1003.

REFERENCE SIGNS LIST

10 Learning unit
11 Training data input unit
12 Variational parameter determination unit
13 Gradient direction lower bound calculation unit
14 Full dimensional lower bound calculation unit
15 Posterior distribution calculation unit
16 γ-message calculation unit
17 Model optimization unit
18 Model output unit
19 Training data storage unit
20 Prediction unit
21 Prediction model input unit
22 Prediction data input unit
23 Variational parameter determination unit
24 Gradient direction lower bound calculation unit
25 Full dimensional lower bound calculation unit
26 Posterior distribution calculation unit
27 Prediction result output unit
28 Prediction model storage unit
29 Prediction data storage unit
30 Prediction result storage unit

What is claimed is:

1. A knowledge tracing device comprising:
one or more memories storing instructions; and
one or more processors configured to execute the instructions to:
determine a variational parameter that specifies a position where a likelihood function representing a non-compensation model for educational skill assessment and a lower bound of the likelihood function to be approximated by Gaussian are in contact;
generate a likelihood function made one-dimensional in a gradient direction at the center of a prior distribution representing learner skill states and calculates the lower bound of the generated likelihood function using quadratic approximation for real-time processing; and
set covariances in directions other than the gradient direction to an arbitrary covariance and calculates the lower bounds of the set covariances to enable reliable educational decision-making.

2. The knowledge tracing device according to claim 1, wherein the processor further executes instructions to set the covariances in directions other than the gradient direction to the variance of a prior distribution.

3. The knowledge tracing device according to claim 1, wherein the processor further executes instructions to determine a position where likelihood exceeds a predetermined threshold or a position obtained by optimizing differentiation of marginal likelihood, as the variational parameter.

4. The knowledge tracing device according to claim 1, wherein the likelihood function is represented as a product of functions that represent skills required by a learner to solve a problem.

5. The knowledge tracing device according to claim 1, wherein the processor further executes instructions to generate an a-message in the Kalman filter by multiplying the lower bound of the calculated likelihood function with the prior distribution.

6. The knowledge tracing device according to claim 5, wherein the processor further executes instructions to generate the a-message using a state transition model in which a bias term representing a feature of a learner is included in a mean of a Gaussian distribution.

7. A knowledge tracing method implemented by a computer, the method comprising:
- determining a variational parameter that specifies a position where a likelihood function representing a non-compensation model for educational skill assessment and a lower bound of the likelihood function to be approximated by Gaussian are in contact;
- generating a likelihood function made one-dimensional in a gradient direction at the center of a prior distribution representing learner skill states and calculating the lower bound of the generated likelihood function using quadratic approximation for real-time processing; and
- setting covariances in directions other than the gradient direction to an arbitrary covariance and calculating the lower bounds of the set covariances to enable reliable educational decision-making.

8. The knowledge tracing method according to claim 7, wherein the computer sets the covariances in directions other than the gradient direction to the variance of a prior distribution.

9. A non-transitory computer readable information recording medium storing a knowledge tracing program, which when executed by a processor, that performs operations comprising:
- determining a variational parameter that specifies a position where a likelihood function representing a non-compensation model for educational skill assessment and a lower bound of the likelihood function to be approximated by Gaussian are in contact;
- generating a likelihood function made one-dimensional in a gradient direction at the center of a prior distribution representing learner skill states and calculating the lower bound of the generated likelihood function using quadratic approximation for real-time processing; and
- setting covariances in directions other than the gradient direction to an arbitrary covariance and calculating the lower bounds of the set covariances to enable reliable educational decision-making.

10. The non-transitory computer readable information recording medium according to claim 9, further comprising:
- setting the covariances in directions other than the gradient direction to the variance of a prior distribution.

* * * * *